United States Patent
Murray

[15] 3,684,009
[45] Aug. 15, 1972

[54] SECTION MILLING TOOL
[72] Inventor: William Kirby Murray, Bossier City, La.
[73] Assignee: Tri-State Oil Tool Industries, Inc., Bossier Parish, La.
[22] Filed: Feb. 25, 1971
[21] Appl. No.: 118,652

[52] U.S. Cl. .................................. 166/55.8, 175/269
[51] Int. Cl. ............................................. E21b 29/00
[58] Field of Search .............. 166/298, 55, 55.6–55.8; 175/267–269, 272, 273, 285, 286, 289, 291

[56] References Cited

UNITED STATES PATENTS

| 1,885,550 | 11/1932 | Santiago | 175/285 X |
|---|---|---|---|
| 2,169,502 | 8/1939 | Santiago | 175/285 X |
| 2,940,523 | 6/1960 | Brown et al. | 166/55.8 |
| 3,003,559 | 10/1961 | Leathers et al. | 175/267 X |
| 3,126,065 | 3/1964 | Chadderdon | 175/269 |
| 3,225,828 | 12/1965 | Wisenbaker et al. | 166/55 |

Primary Examiner—David H. Brown
Attorney—J. Vincent Martin, Joe E. Edwards, M. H. Gay, Alfred H. Evans and Jack R. Springgate

[57] ABSTRACT

A section milling tool including a body and cutters which are actuated in a predetermined sequence whereby one end is first moved outward to engage and cut an opening in a casing, after which the other end is moved outward to position the cutters within the opening so that substantially their entire length is made available for milling the casing.

5 Claims, 7 Drawing Figures

PATENTED AUG 15 1972

3,684,009

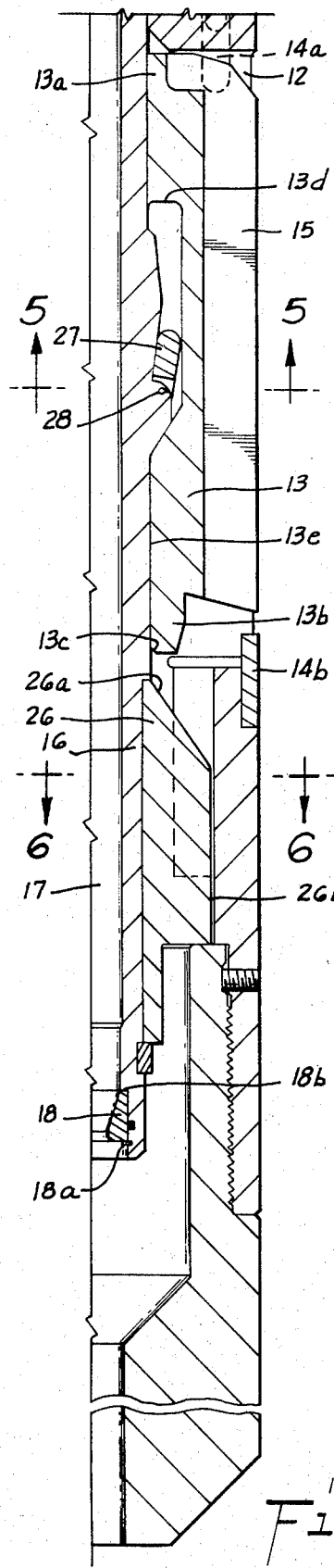

SECTION MILLING TOOL

This invention relates to section milling tools, and particularly to section milling tools adapted to be positioned within a casing, pipe, or other tubular member, to cut an opening from the inside outward and then mill away the casing, pipe, etc., below the opening. The limiting factor in the usefulness of such milling tools is the amount of cutter blade remaining available for the milling operation after the initial opening is cut.

In prior art section mills the cutters are pivoted at one end so that the other end swings outwardly into engagement with the pipe to cut the opening. After the opening is made and the cutters pivot fully outward to mill the casing, less area than that provided by this invention is available for the milling operation. Means for increasing the amount of cutter available for milling, and especially means for making substantially the entire length of each cutter available for milling, would result in obvious economies.

It is, accordingly, the primary object of this invention to provide a section milling tool wherein substantially the entire longitudinal dimension of the cutters is made available for milling after the initial opening is cut in the pipe.

Another object is to provide such a section milling tool wherein the cutters are first moved outwardly at one end to cut an opening, and then moved fully outward into a position where their longitudinal outer surfaces are approximately parallel to the axis of the casing being milled, whereby a maximum amount of cutter is made available for milling and whereby increased downward loading on the tool is made possible.

These and other objects and advantages of the invention will become apparent from the drawings, specification and claims. In the accompanying drawings which illustrate the preferred embodiment of the invention, and wherein like numerals indicate like parts:

FIG. 1 is a view partly in elevation and partly in section of the preferred form of milling tool disposed within a casing and with the lower ends of the cutters being moved outward to cut an initial opening in the casing.

FIG. 2 is sequential to FIG. 1 showing the tool as the initial opening is made and enlarged.

FIG. 3 is sequential to FIG. 2 showing the tool with the cutters fully extended and in milling position.

FIGS. 4A and 4B comprise a quarter-section view of the preferred form of milling tool as it is run into the well bore.

FIG. 5 is a view in horizontal section taken along lines 5—5 of FIG. 4A.

FIG. 6 is a view in horizontal section taken along lines 6—6 of FIG. 4A.

The tool includes an outer body 10 formed of three tubular sections threadedly connected and having a central bore 11 therethrough. The uppermost section terminates in a tapered threaded pin 10a for connection with a tubing or pipe string T by which the tool may be suspended in a pipe or casing C. The body 10 has a plurality of radially spaced vertical slots 12 which extend through the body from bore 11 to the outside. Six of said slots are shown but the number is subject to variation. A cutter 13 is mounted in each slot for limited radial movement relative to the body 10. Upper and lower dogs 13a and 13b on each cutter engage upper and lower keepers 14a and 14b on the body 10 to limit maximum outward movement of the cutters. The outer, or blade portion 15 of each cutter is formed of some suitably hard substance for cutting and milling steel, such as carbide particles dispersed in a matrix.

For actuating the cutters 13 in the desired sequence, there is slidably disposed within the bore 11 of body 10 a tubular mandrel 16. The mandrel 16 has a central bore or passageway 17 having a restricted bore and tapered seat 18 at its lower end. Seat 18 is held in the lower end of bore 17 by snap ring 18a at its lower end and downwardly facing annular shoulder 17a of bore 17 at its upper end. A piston 19 is provided on the mandrel 16 and includes a sealing ring 20 which seals with the wall of the body 10. O-rings 21 seal between the mandrel 16 and a counterbore 10b of the body 10 below piston 19 so that there is formed between the mandrel and body an annular fluid cylinder 22. A port 23 provides fluid communication between the bore 17 of mandrel 16 and this fluid cylinder 22. Port 24 in the wall of the upper section of the body 10 provides fluid communication between the annular space surrounding the tool and the area between mandrel 16 and body 10 above piston 19. A coil spring 25 which is confined between the upper surface of the piston and an internal shoulder 10c within the upper section of the body 10 urges piston 19 and mandrel 16 downwardly.

A plurality of cutter-actuating cam members 26 are provided near the lower end of mandrel 16 and each has an upwardly and inwardly sloping cam surface 26a adapted to coact with the lower rear portion 13c of cutter 13 to urge the lower end of the cutter radially outwardly into a position to cut the well casing.

Spaced upwardly from cams 26 are a plurality of pivoted arms 27 mounted on the mandrel 16 by pins 28. One arm 27 is provided for each cutter 13 and is adapted, upon sufficient upward movement of mandrel 16, to engage an internal shoulder 13d which is formed on the upper portion of the inner surface of each cutter 13. Thereafter, as the mandrel continues upward, the arm 27 urges the upper end of cutter 13 radially outwardly so that, as will be explained hereinafter, the cutter in its final extended position has its longitudinal surface approximately parallel to that of the casing being milled.

In operation, the tool is run into a well bore at the end of tubing string T and positioned adjacent the section of casing C which it is desired to cut and mill. The parts are initially positioned as shown in FIGS. 4A and 4B. Fluid pressure is then built up within the tool by pumping fluid down through tubing T faster than restriction 18 will permit its escape. Pressurizing fluid will pass from bore 7 of the mandrel 16 through port 23 into fluid cylinder 22 and will urge the piston 19 upward against the force of spring 25. As piston 19 and mandrel 16 move upward relative to the body 10, cam surface 26a will engage the lower rear portion 13c of cutter 13, causing the lower end of cutters 13 to swing outwardly into engagement with the inner surface of casing C. The tool is then rotated by means of the tubing string T, in the usual way to cut an opening or window in casing C. The parts are shown in this position in FIG. 1 with the cutter 13 just beginning to cut into casing C.

As the opening is made and enlarged, the lower end of cutters 13 will move farther outwardly responsive to cams 26, thus permitting mandrel 16 to move further upwardly relative to body 10 and cutters 13. Continued upward movement of mandrel 16 causes pivoted arm 27 to engage shoulder 13d on cutter 13 to urge the upper end of cutter 13 outwardly. The parts are shown in this position in FIG. 2 with the lower end of cutter 13 having penetrated casing C and with arm 27 just engaging shoulder 13d.

When the opening in casing C is sufficiently large, cutter 13, responsive to cam 26 and arm 27, will move fully outwardly into the position shown in FIG. 3 with its outer longitudinal surface approximately parallel to the longitudinal axis of casing C. Mandrel 16 will move into its fully upward position so that vertical surface 26b on cam 26 engages vertical surface 13e on the back of cutter 13. The cutter is then held by surface 26b on cam 26 by pivot arm 27 and keepers 14a and 14b in its fully extended and vertical position (FIG. 3), thereby locating each cutter in alignment with and above the wall of the casing which is to be milled and making the full length of each cutter available for milling. Maximum upward movement of mandrel 16 is limited by upper surface 19a on piston 19 engaging downwardly facing annular shoulder 10d on body 10.

The force necessary for the milling is supplied to the cutters by downward loading on the tool. Since the cutters in their fully extended milling position remain vertical, this downward loading, or force, is carried by the cutters primarily as compression loading. In the prior art milling tools using pivoted cutters, much of the loading must be carried in shear. As will be apparent to those skilled in the art, the compression loading feature of the cutters of the present invention permits heavier loading of the cutters, enabling them to mill at a faster rate.

Milling of the casing C is continued as shown in FIG. 3 until the entire length of blade portion 15 of cutters 13 has been worn away by the milling operation. When the cutters are completely worn, hydraulic pressure is relieved and spring 25 will return mandrel 16 to its original position so that the tool may be withdrawn from the well.

The foregoing disclosure and description of the invention is illustrative and explanatory thereof, and various changes in the size, shape and materials, as well as in the details of the illustrated construction may be made within the scope of the appended claims without departing from the spirit of the invention.

What is claimed is:

1. A section milling tool comprising
a body adapted to be supported within a casing,
a cutter supported by said body for limited radial movement,
means for actuating said cutter in a predetermined sequence whereby one end is first moved outward to cut an opening in the casing, after which the other end is moved outward to position the cutter within the opening.

2. A section milling tool comprising
a body adapted to be supported within a casing,
a cutter supported by said body for limited radial movement,
means for initially moving one end of said cutter radially outwardly to cut an opening in said casing,
means for subsequently moving the other end of said cutter radially outwardly to position said cutter within the opening.

3. A section milling tool comprising
a tubular body adapted to be suspended within a casing,
a longitudinal cutter supported by said body for limited radial movement,
a mandrel longitudinally movable within the bore of said body,
means on said mandrel for initially moving one end of said cutter radially outwardly to cut an opening in said casing,
means on said mandrel for subsequently moving the other end of said cutter radially outwardly to position said cutter longitudinally within said opening, whereby substantially the entire length of said cutter is made available for milling said casing.

4. A section milling tool comprising
a tubular body having a plurality of longitudinal openings,
a cutter positioned in each said opening and movable radially with respect to said body,
a mandrel longitudinally movable within the bore of said body,
a piston on said mandrel,
seal means on the body to seal between said body and said mandrel,
means for introducing a pressure fluid between said mandrel and said body between said piston and said seal means to move said mandrel upwardly within said bore,
cam means on said mandrel adapted to engage the lower end of said cutter as said mandrel moves upward to urge the lower end radially outwardly, and
means on said mandrel adapted to coact with the upper end of said cutter as said mandrel moves further upward to move said upper end radially outwardly.

5. The apparatus of claim 4 wherein resilient means are provided for returning said mandrel to its original position upon the release of said pressuring fluid.

* * * * *